(12) United States Patent
El-Najjar et al.

(10) Patent No.: US 9,867,104 B2
(45) Date of Patent: Jan. 9, 2018

(54) CENTRALIZED NETWORK MANAGEMENT FOR DIFFERENT TYPES OF RAT

(71) Applicant: Telefonaktiebolaget LM Ericsson (publ), Stockholm (SE)

(72) Inventors: Jad El-Najjar, Montreal (CA); Suliman Albasheir, Saint-Laurent (CA)

(73) Assignee: Telefonaktiebolaget LM Ericsson (publ) (SE)

( * ) Notice: Subject to any disclaimer, the term of this patent is extended or adjusted under 35 U.S.C. 154(b) by 0 days.

(21) Appl. No.: 15/122,648

(22) PCT Filed: Mar. 4, 2014

(86) PCT No.: PCT/IB2014/059436
§ 371 (c)(1),
(2) Date: Aug. 31, 2016

(87) PCT Pub. No.: WO2015/132629
PCT Pub. Date: Sep. 11, 2015

(65) Prior Publication Data
US 2017/0078937 A1   Mar. 16, 2017

(51) Int. Cl.
*H04W 36/00* (2009.01)
*H04W 24/02* (2009.01)
(Continued)

(52) U.S. Cl.
CPC ........... *H04W 36/22* (2013.01); *H04W 24/02* (2013.01); *H04W 36/0011* (2013.01);
(Continued)

(58) Field of Classification Search
CPC .. H04W 36/0011; H04W 24/02; H04W 36/38
See application file for complete search history.

(56) References Cited

U.S. PATENT DOCUMENTS

| 6,845,238 B1 | 1/2005 | Müller et al. |
| 7,684,800 B2 | 3/2010 | Kühn et al. |
(Continued)

FOREIGN PATENT DOCUMENTS

| WO | 2009149600 A1 | 12/2009 |
| WO | 2011020483 A1 | 2/2011 |

*Primary Examiner* — Asghar Bilgrami
(74) *Attorney, Agent, or Firm* — Murphy, Bilak & Homiller, PLLC

(57) ABSTRACT

Techniques and apparatus disclosed herein include methods for allocating data sessions among two radio access networks (RANs), as might be carried out in a network management node operatively connected to one or more network nodes in each of a first RAN and a second RAN, where the first and second RANs have overlapping coverage areas. An example method includes receiving (401) current data session information and network performance information for each of the first and second RANs, from the one or more network nodes, and computing (402) a reallocation of data sessions among the first and second RANs, based on the performance information and configuration data for the first and second RANs, using a metaheuristic algorithm. The method further includes triggering (403, 404) a transfer of one or more current data sessions between the first and second RANs, based on the computed reallocation.

20 Claims, 7 Drawing Sheets

(51) Int. Cl.
*H04W 36/38* (2009.01)
*H04W 36/22* (2009.01)
*H04W 88/18* (2009.01)
*H04W 92/02* (2009.01)

(52) U.S. Cl.
CPC ............ *H04W 36/38* (2013.01); *H04W 88/18* (2013.01); *H04W 92/02* (2013.01)

(56) References Cited

U.S. PATENT DOCUMENTS

| | | | |
|---|---|---|---|
| 2011/0252123 A1 | 10/2011 | Sridhar et al. | |
| 2012/0082104 A1* | 4/2012 | Lysejko | H04W 72/082 370/329 |
| 2012/0131204 A1* | 5/2012 | Song | H04L 12/1822 709/227 |
| 2012/0295623 A1* | 11/2012 | Siomina | H04W 64/00 455/436 |
| 2013/0072186 A1* | 3/2013 | Picker | H04W 8/12 455/432.1 |
| 2013/0121282 A1 | 5/2013 | Liu et al. | |
| 2013/0310095 A1 | 11/2013 | El-Najjar | |

* cited by examiner

CENTRALIZED NETWORK MANAGEMENT FOR DIFFERENT TYPES OF RAT

TECHNICAL FIELD

The present disclosure relates generally to wireless communication systems, and more particularly relates to systems for allocating wireless data sessions among multiple radio access networks having overlapping coverage areas.

BACKGROUND

Members of the 3rd-Generation Partnership Project (3GPP) have developed specifications for the UTRAN (Universal Terrestrial Radio Access Network), which is the formal name for the radio access network of a Universal Mobile Telecommunications System (UMTS). Because the UTRAN is based on the use of Code-Division Multiple Access (CDMA) technology for the radio links between base stations and mobile terminals, the UTRAN is commonly referred to as a Wideband-CDMA (W-CDMA) network, and sometimes as Wireless Radio Access Networks (WRANs). The UTRAN consists of Radio Network Controllers (RNCs) and radio base stations (RBS's) that are referred to as NodeBs in 3GPP documentation. The NodeBs communicate wirelessly with mobile terminals, generally referred to as user equipment or UEs in 3GPP documentation, while RNC controls one or more of the NodeBs. The RNCs further provide connectivity to the Core Network (CN), which provides connectivity to public data networks such as the Internet.

Evolved UTRAN (E-UTRAN), also specified by the 3rd-Generation Partnership, is the evolution of the UTRAN towards a high-data rate, low-latency, and packet-optimized radio access network, and is commonly referred to as the Long-Term Evolution (LTE) wireless network. LTE networks use Orthogonal Frequency-Division Multiplexing (OFDM) in the downlink (transmissions from base station to mobile terminal) and Discrete Fourier Transform (DFT)—spread OFDM in the uplink (transmissions from mobile terminal to base station). The basic LTE downlink physical resource can thus be seen as a time-frequency grid, where each resource element corresponds to one OFDM subcarrier during one OFDM symbol interval. E-UTRAN consists of interconnected eNodeBs (evolved Node Bs) that are further connected to the Evolved Packet Core network (EPC). Because the eNodeBs include more functionality and are more autonomous in their operation than the NodeBs in UTRAN, RNCs are not needed in the E-UTRAN.

As currently deployed, LTE and WCDMA networks may have overlapping coverage areas, and may in some cases be operated by the same operators in a given region. However, these LTE and WCDMA networks generally operate separately, and generally do not interact with one another so as to optimize, in an intelligent manner, the allocation of network resources. This can lead to unnecessary degradations of network services and service outages.

SUMMARY

The techniques described in detail below provide a dynamic, intelligent WCDMA-LTE interaction allowing for more optimal allocation of wireless sessions between the technologies. These techniques may be used to drive capacity optimization between the two technologies and will enhance and optimize network performance, in a dynamic intelligent, coordinated and proactive manner.

Example embodiments of the techniques and apparatus disclosed herein include methods for allocating data sessions among two radio access networks (RANs), as might be carried out in a network management node operatively connected to one or more network nodes in each of a first RAN and a second RAN, where the first and second RANs have overlapping coverage areas. An example of these methods includes receiving current data session information and network performance information for each of the first and second RANs, from the one or more network nodes, and computing a reallocation of data sessions among the first and second RANs, based on the performance information and configuration data for the first and second RANs, using a metaheuristic algorithm. The method further includes triggering a transfer of one or more current data sessions between the first and second RANs, based on the computed reallocation. The methods disclosed herein may be employed in network management node coupled to a Long Term Evolution (LTE) wireless network and a Wideband Code-Division Multiple Access (W-CDMA) wireless network, for example.

In some embodiments, the metaheuristic algorithm is based on an objective function that comprises a summation of performance metrics for each of a plurality of network nodes in each of the first and second RANs, where the performance metrics are based on allocations of data sessions to each of the plurality of network nodes and where the objective function is subject to one or more data session capacity constraints for the first and second RANs. In some embodiments, the metaheuristic algorithm employs a simulated annealing metaheuristic.

The plurality of network nodes in the first and second RANS may include multiple base stations, for example, or one or more radio network controllers, or a combination of both. The performance metrics for one or more of the plurality of network nodes, for each given allocation of data sessions, may be based on one or more of: an estimated uplink or downlink throughput, or both, for the network node; an estimated delay for data traffic through the network node; and a processor load for the network node. In some embodiments, the performance metrics for the network nodes as used in the metaheuristic algorithm are weighted according to pre-determined prioritization weights.

In some embodiments, the receiving, computing, and triggering operations discussed above are repeated upon each completion of the triggering operation. In other embodiments, these operations are repeated at pre-determined intervals. In still other embodiments, the receiving, computing, and triggering operations are initiated in response to a problem detection in one or both of the RANs.

Network node apparatus adapted to carry out any of the several techniques summarized above, and variants thereof, are also disclosed in the detailed discussion that follows. Of course, the present invention is not limited to the above-summarized features and advantages. Indeed, those skilled in the art will recognize additional features and advantages upon reading the following detailed description, and upon viewing the accompanying drawings.

DETAILED DESCRIPTION

Figure 1:
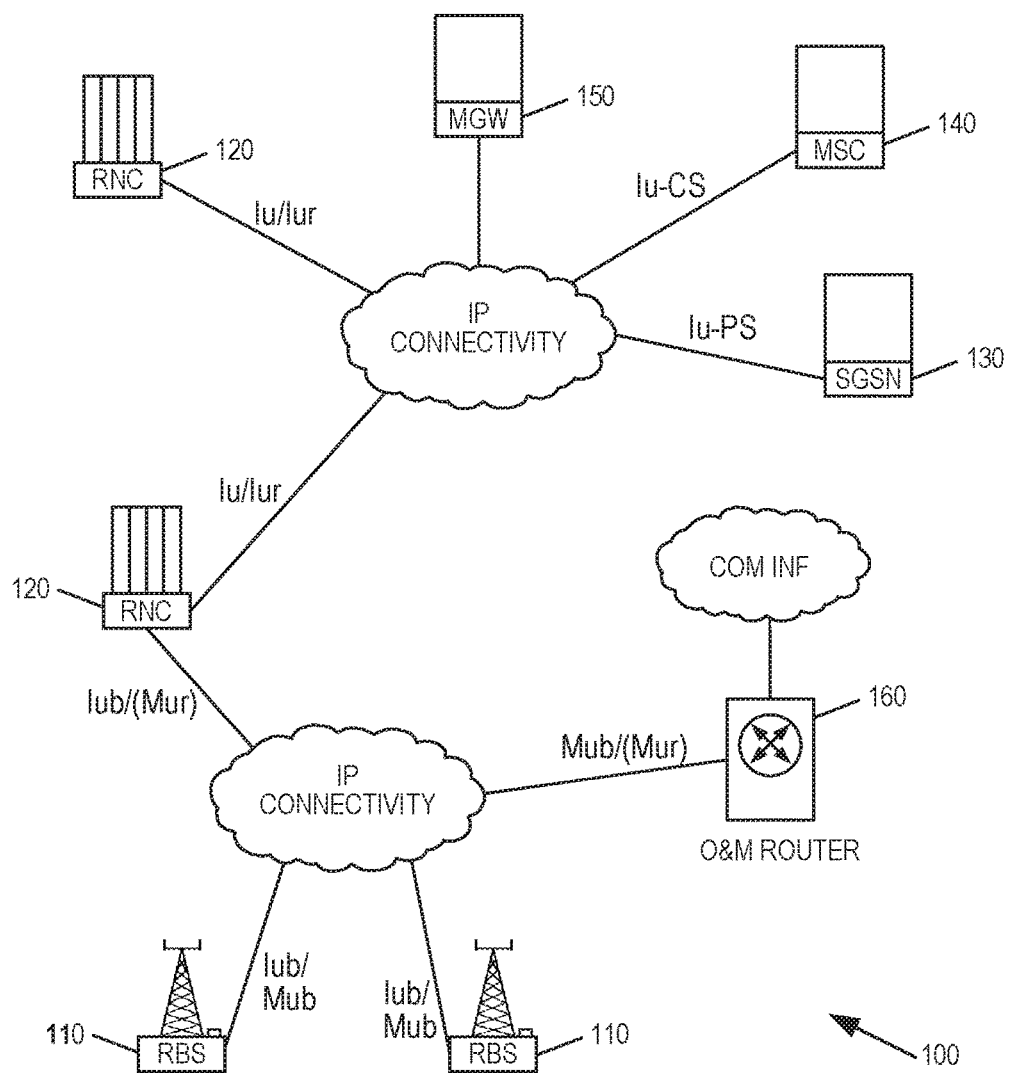
FIG. 1 is a schematic diagram of a WCDMA RAN.

Within the context of this disclosure, the terms "mobile terminal," "wireless terminal," or "wireless device" refer to any terminal that is able to communicate wirelessly with an access node of a wireless network by transmitting and/or receiving wireless signals. Thus, the term "mobile terminal" encompasses, but is not limited to: a user equipment (e.g., an LTE UE), whether that user equipment is a cellular telephone, smartphone, wireless-equipped tablet computer, etc.; a stationary or mobile wireless device for so-called machine-to-machine (M2M) communication or machine-type communication (MTC); or an integrated or embedded wireless card forming part of a computer or other electronic equipment; a wireless card, dongle, or the like, for plugging in to a computer or other electronic equipment. Throughout this disclosure, the terms "user equipment" and "UE" are sometimes used to exemplify various embodiments. However, this should not be construed as limiting, as the concepts illustrated herein are equally applicable to other wireless terminals. Hence, whenever a "user equipment" or "UE" is referred to in this disclosure, this should be understood as encompassing any mobile terminal or wireless terminal as defined above.

In the discussion that follows, specific details of particular embodiments of the presently disclosed techniques and apparatus are set forth for purposes of explanation and not limitation.

It will be appreciated by those skilled in the art that other embodiments may be employed apart from these specific details. Furthermore, in some instances detailed descriptions of well-known methods, nodes, interfaces, circuits, and devices are omitted so as not to obscure the description with unnecessary detail. Those skilled in the art will appreciate that the functions described may be implemented in one or in several nodes.

Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above. Likewise, the term "processing circuit," as used herein, may also refers to a processor or controller, and should be understood to include circuits that include the combination of one or more programmable circuits (e.g., microprocessors, microcontrollers, digital signal processors, or the like) with memory containing program instructions for execution by the processing circuit.

References throughout the specification to "one embodiment" or "an embodiment" mean that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

While the following examples are described in the context of LTE systems and WCDMA systems, the principles described in the following disclosure may be equally applied to other functional contexts and other cellular networks.

As noted above, LTE and WCDMA networks generally operate separately, and generally do not interact with one another so as to optimize, in an intelligent manner, the allocation of network resources. This can lead to a waste of inter-technology resources, which can in turn result in unnecessary degradations of network services and service outages. One particular limitation on the networks' ability to optimally allocate resources is that, typically, the only time that a UE switches from a LTE network to a WCDMA network is when the LTE radio frequency (RF) signal becomes low or disappears. The lack of capacity coordination and dynamic resource allocation between the LTE and WCDMA networks leads to customer non-satisfaction when customers experience downgraded services, more network outages, and performance degradation.

The techniques described in detail below provide a dynamic, intelligent WCDMA-LTE interaction allowing for more optimal allocation of wireless sessions between the technologies. These techniques may be used to drive capacity optimization between the two technologies and will enhance and optimize network performance, in a dynamic intelligent, coordinated and proactive manner.

Before these techniques are detailed, some context is provided. FIG. 1 is a schematic diagram providing a simplified view of a portion of a WCDMA radio access network (RAN) 100. WCDMA RAN 100 includes multiple radio base stations (RBSs) 110, which are commonly referred to as NodeBs. The illustrated network further includes multiple radio network controllers (RNCs) 120, a Service GPRS Support Node 130, a Mobility Switching Center (MSC) 140, a Media Gateway (MGW) node 150, and an Operations & Maintenance (O&M) Router 160.

The RNC 120 is the node that controls the NodeBs and the radio resources. It is a service access point providing services to the core network. The NodeB or RBS 110 provides physical resources (i.e., radio resources) and converts data flows between the Tub interface, which is the 3GPP-defined interface between the NodeB and RNC, and the Uu interface, which is the 3GPP-defined interface providing connectivity between the user equipment (UE) and the NodeB. The SGSN core node 130 is responsible for the packet switching connections of the mobile terminals (user equipment, or UEs, in 3GPP terminology) accessing the network. It establishes Packet Data Protocol (PDP) contexts for the UEs with the Gateway GPRS Support Node (GGSN) in the core network. The MSC core node 140 is responsible for the setting up and maintaining circuit switching connections.

FIG. 1 also identifies the standardized interfaces between the various components of the network. These include the Tub interface, which is the interface between the NodeBs 110 and the RNCs 120, the Iur interface, which is an RNC-to-RNC interface, the Mub interface, which is a management interface provided by the NodeBs 110 and used, for example, by the O&M Router 160, the Mur interface, which is a management interface provided by RNCs 120 and used by O&M Router 160, the Iu-CS interface, which interconnects the MSC 140 and the RNCs 120, and the Iu-PS interface, which interconnects the SGSN 130 and the RNCs 120. Detailed definitions for all of these interfaces may be found in the 3GPP documentation for UTRA, at http://www.3gpp.org.

Figure 2:
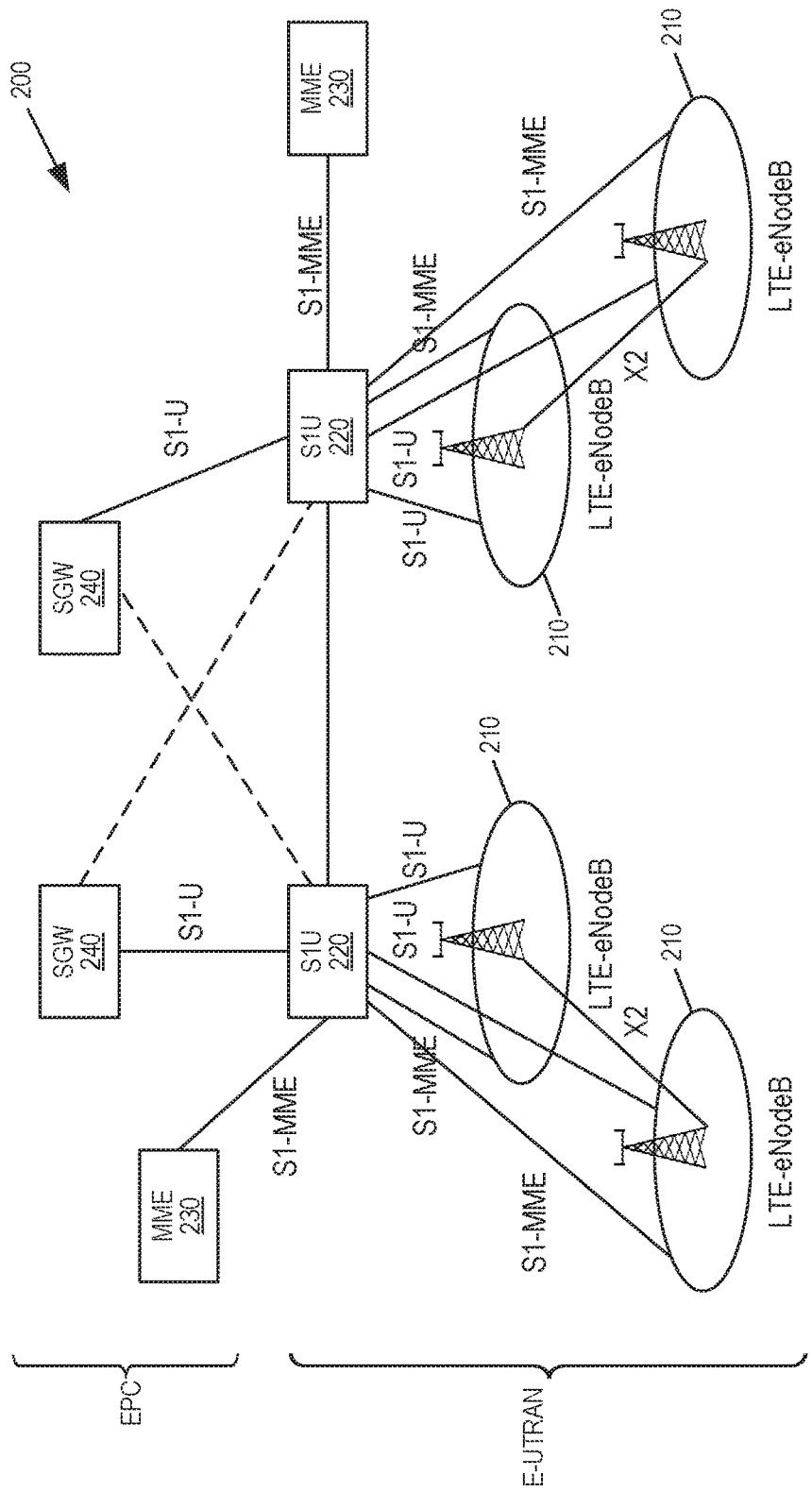
FIG. 2 is a schematic diagram of an LTE network.

FIG. 2 is a schematic diagram providing a view of a portion of an LTE RAN, i.e., E-UTRAN, as well as its connections to the core network, known as the evolved packet core (EPC) in 3GPP terminology. As seen in FIG. 2, the E-UTRAN includes base stations 210 referred to as eNodeBs, which communicate with one another over the standardized X2 interface. eNodebs 210 are also interconnected, via Site Integration Units (SIUs) 220, to nodes in the EPC, including Mobility Management Entities (MMEs) 230 and Serving Gateways (SGWs) 240. These interconnections are provided over the S1-MME and S1-U interfaces, respectively.

Thus, as seen in FIG. 2, the LTE network architecture is divided into two parts: the EPC (Evolved Packet Core) and the E-UTRAN (Evolved-Universal Terrestrial Radio Access Network). The EPC consists mainly of the SGWs 240 and the MMEs 230, whereas the E-UTRAN contains mainly the LTE ENodeBs 210 and SIUs 220. It should be noted that an ENodeB may also be referred to as a DUL (Digital Unit LTE).

The LTE eNodeB 210 (which for simplicity reasons could be referred to as DUL) is the network component that provides the air interface to the User Equipment (UE). It is responsible for radio transmission to and reception from UEs in one or more cells. It is connected to its neighbor eNodeBs 210 by means of the X2 interface and to the EPC nodes (respectively SGW 240 and MME 230) via the SIU 220 for both User Plane (UP) and Control Plane (CP) data transfer.

The MME 230 is part of the EPC core network and it handles Control Plane (CP) messages from the E-UTRAN nodes. It keeps track of UEs moving around within the MME's service area. It handles Non-Access Stratum (NAS) signaling, including security, e.g., integrity protection and ciphering. It manages handovers, including X2-based handovers (intra-MME, with or without SGW re-selection), and S1-based handovers (intra- or inter-MME, with or without SGW re-selection).

The SGW 240 is a data plane GW that manages user-plane mobility between the LTE RAN and core networks. SGW 240 maintains data paths between eNodeBs 210 and the PDN Gateway (PGW, not shown). From a functional perspective, the SGW 240 is the termination point of the packet data network interface towards E-UTRAN. The SGW routes and forwards the user packet data from the UE to the PGW or from the PGW to the UE. The SGW acts as a local mobility anchor for the user plane during inter-eNodeB handovers and provides charging functionality A Tracking Area (TA) consists of one or more cells. The size of a TA can range from a part of a city to an entire province. A TA can be covered by one or multiple MMEs 230, if MME pooling is used. The UE can move between TAs within the MME area without having to change MME. All TAs served by the same MME, that is, TAs that the UE can enter without initiation a Tracking Area Update (TAU) procedure, are listed in a Tracking Area Identity (TAI) list. When the UE leaves the TAI list coverage area it has to initiate the TAU procedure.

An SGW service area is defined as an area where the UE is served without having to change SGWs. An SGW service area is served by one or more SGWs 240 in parallel. SGW service areas are a collection of complete TAs. SGWs service areas may overlap each other.

As noted above, the LTE and WCDMA/WRAN networks as depicted in FIGS. 1 and 2 are currently separated and do not interact to optimize intelligently the capacity of the network resources. The waste of inter-technology network resources is not being handled adequately and leads to network services degradation and outages. In particular, as noted above, it is unfortunate that the only way to switch from LTE to WCDMA/WRAN happens when the LTE RF signal becomes low or disappears.

Figure 3:
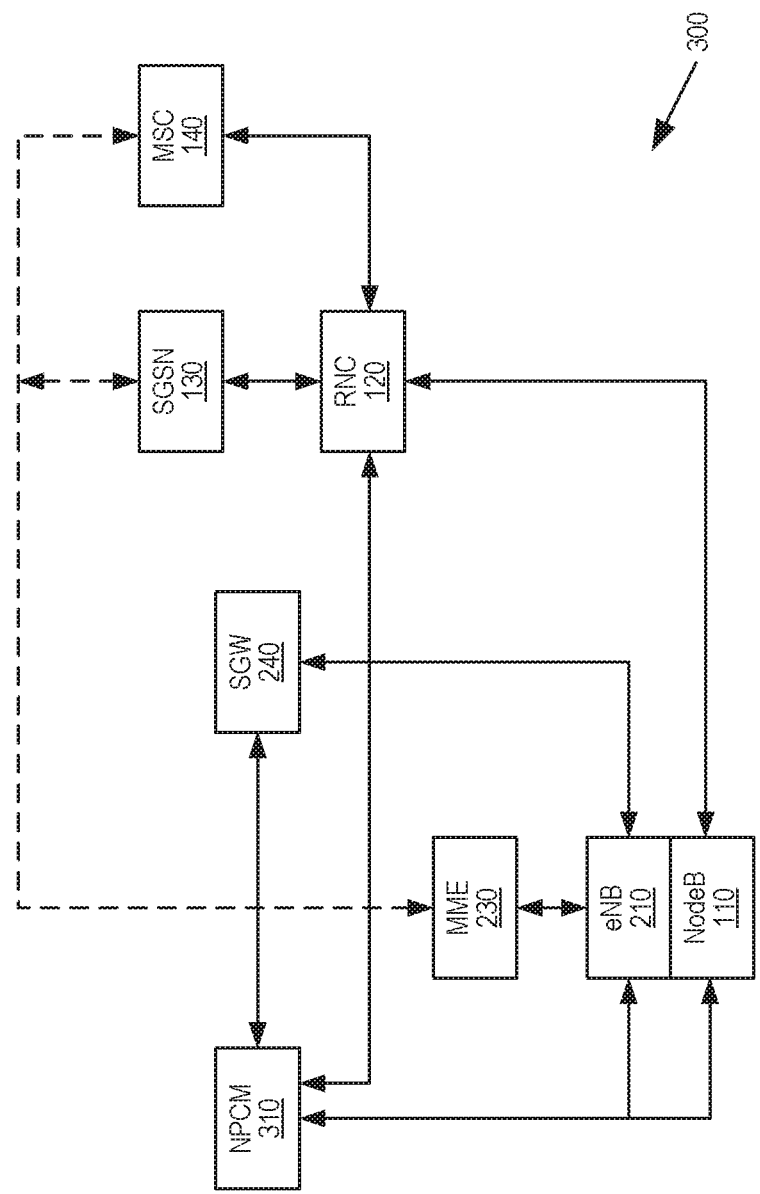
FIG. 3 illustrates WCDMA and LTE network nodes interconnected by a Network Platform Capacity Manager (NPCM).

FIG. 3 is a schematic diagram illustrating how the LTE and W-CDMA networks can be interconnected, with the aid of a network management node 310 referred to here as a Network Platform Capacity Manager (NPCM) node. The NPCM is key to allow performance and configuration monitoring of both networks, dynamic smart computation, and interaction of WCDMA and LTE for Optimal Inter-Technology Capacity Driven Session Allocation. The NPCM will also propagate the optimal configuration every now and then for increased performance of the inter-technology networks which will reallocate accordingly there sessions. One result is that the LTE/WCDMA interaction is no longer limited to loss of RF signal. As can be seen in FIG. 3 and as is further detailed below, interconnecting LTE and WCDMA systems with an NPCM 310 enables an inter-technology signaling exchange performed between MMEs, SGSNs and MSCs for seamless, on the fly inter-technology smart session re-allocation.

Figure 4:
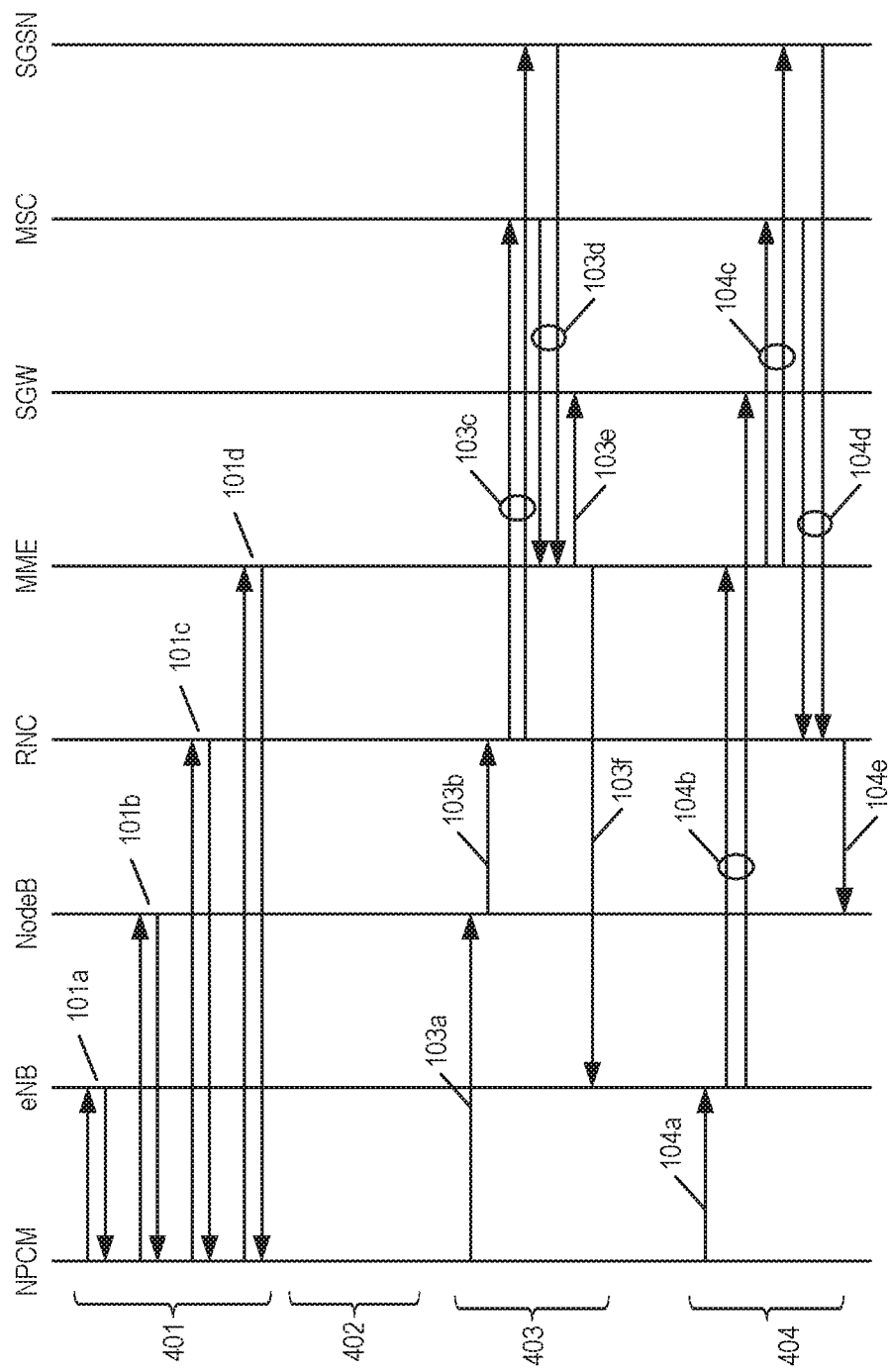
FIG. 4 is a signaling flow diagram illustrating an example signaling flow according to some embodiments of the presently disclosed techniques and apparatus.

The structure of the NPCM 310 will be described in detail below. First, however, the operation of the NPCM 310 and its interaction with the other nodes in FIG. 3 will be described. FIG. 4 illustrates a series of signaling messages between various ones of the network nodes shown in FIG. 3. These signaling messages are grouped into several "phases," numbered 401, 402, 403, and 404. These four phases correspond directly to the operations having the same numbers in the process flow diagram of FIG. 5. It will be appreciated, however, that the specific signaling flows and/or signaling sequence corresponding to any particular implementation of the process flow diagram of FIG. 5 may vary somewhat from the signaling flows and sequence shown in FIG. 4.

Figure 5:
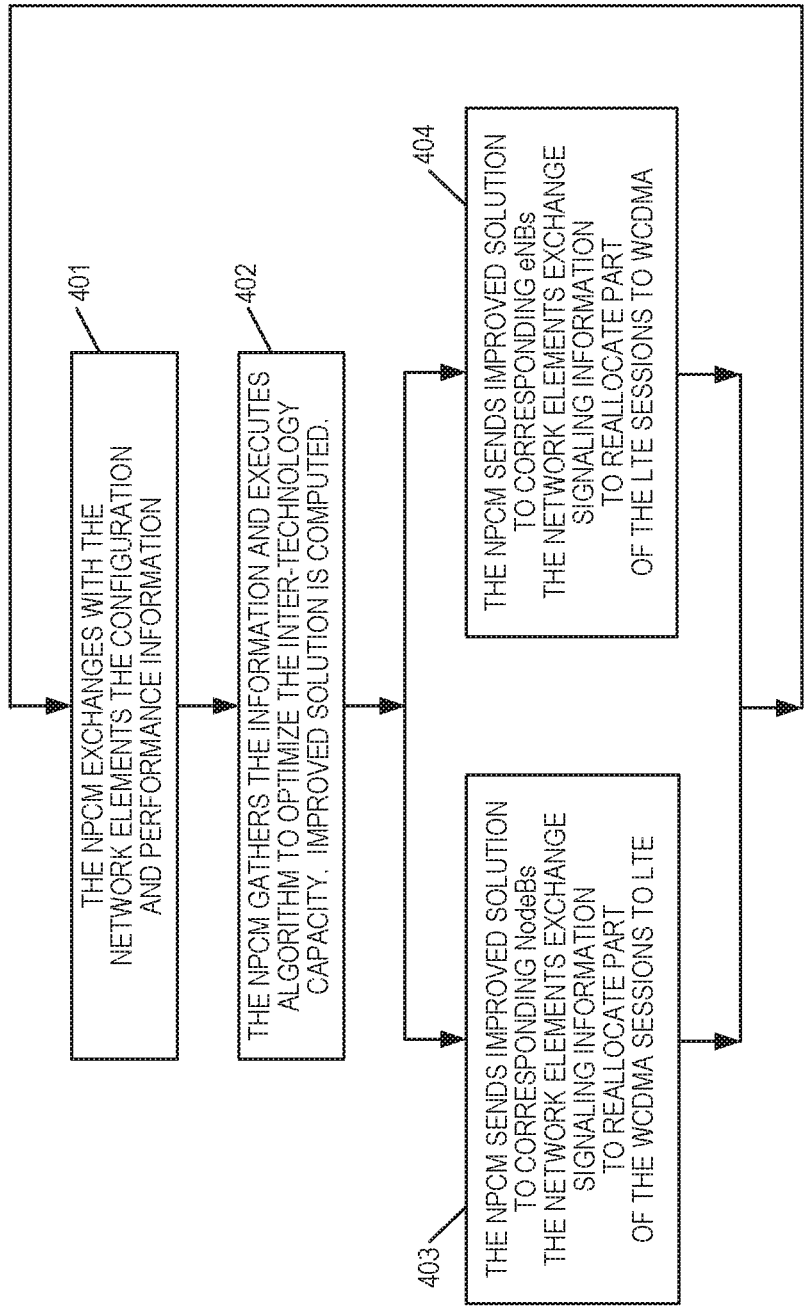
FIG. 5 is a process flow diagram corresponding to the signaling flow diagram of FIG. 4.

The four phases shown in FIGS. 4 and 5 are detailed below.

Monitoring phase 401: In this phase, the NPCM monitors the WCDMA network and the LTE network, more precisely the eNBs, SGWs LTE network components and the nodeBs, RNCs WCDMA/WRAN network components. This includes the collection of performance, configuration, and sessions information from the various nodes. As shown in the example signaling flow of FIG. 4, this information may be collected directly from each of the various nodes, as shown in signaling exchanges 401a, 401b, 401c, and 401d. In other embodiments, however, some or all of the performance, configuration, and sessions information may be collected indirectly. For example, in some embodiments the NPCM may request information from an RNC, which collects some of the information from one or more NodeBs before responding to the NPCM.

Computation phase 402: The NPCM proceeds with the computation phase (which doesn't include any signaling in FIG. 4) after collecting all the configuration and performance metrics. The NPCM computes an improved inter-technology capacity sessions assignment, allocation, or reallocation. The computation is based on a meta-heuristic algorithm, which seeks (but may not necessarily achieve) an optimal solution without an exhaustive search of the problem space. The objective is to minimize, or at least reduce, any waste of capacity resources in an inter-technology network, while maintaining or increasing network performance, by assigning or re-assigning sessions from the LTE RAN to the WCDMA RAN and/or from the WCDMA RAN to the LTE RAN.

In this phase, current configuration, performance, and data sessions information from monitoring phase 401 are collected and analyzed. The meta-heuristic algorithm is executed and new inter-technology networks configurations (sessions allocation) are computed. The resulting new configuration will contain all the sessions re-allocation from (to) LTE to (from) WCDMA, the respective eNBs, MMES, SGWs, NodeBs, RNCs, MSCs and SGSNs that are part of this re-allocation. These new configurations, part of the computed improved solution, are then transmitted in phases 403 and 404 to the particular NodeBs and eNBs, so the changes can take place.

Execution phase 403—WCDMA to LTE: As shown in FIG. 4 at 403a, the improved solution computed previously, specifically any reallocations of data sessions, is propagated to the NodeBs, in some embodiments. The NodeB then informs RNC of which UEs sessions are to be dynamically reallocated to LTE, as shown at 403b. As shown at 403c, the RNC sends information to MSC and SGSN for the sessions that are to be reallocated to LTE. As seen at 403d, the SGSN and MSC communicate to MME the session establishment requests that are needed. The MME informs the SGW and affected eNBs, as shown at 403e and 403b. The eNB re-assigns sessions to UEs that have now moved from WCDMA/WRAN to LTE.

Execution phase 404—LTE to WCMA: As shown in FIG. 4 at 404a, information specifying any reallocations of data sessions from LTE to WCDMA, is propagated to the eNodeBs, in some embodiments. The eNB communicates to MME and SGW information specifying those sessions that are to be reallocated to WCDMA/WRAN, as shown at 404b.

As seen at 404c, the MME informs MSC and SGSN to allocate sessions to circuit switching and packet switching accordingly, based on LTE sessions Quality Channel Indicators (QCIs) requirements. The SGSN and MSC send information to RNC, as shown at 404d, and the RNC communicates to its NodeB about the new sessions that will be established in WCDMA, as seen at 404e. The NodeB requests the UEs sessions to switch from LTE to WCDMA/WRAN accordingly.

Note that in some instances those UEs that are suitably equipped can have both LTE and WCDMA sessions, such that, for example, some dedicated circuit-switched sessions remain anchored in the W-CDMA RAN via the NodeB, RNC, and MSC, while one or more packet-switched sessions are switched to the LTE network, for servicing by the eNb and SGW. Both circuit-switched and packet-switched sessions between the UE and the RAN are referred to herein as "data sessions," though it will be appreciated that circuit-switched and packet-switched sessions may have differing requirements and/or may be handled by different network nodes. It should also be noted that the dynamic WCDMA-LTE interaction for optimal inter-technology capacity-driven session allocation illustrated here may be performed on a scale that can involve hundreds of network elements. For simplicity and clarity of discussion, only one of each type of network element is shown in the signaling flow of FIG. 4. In practice, a given NPCM may perform signaling concurrently, or nearly concurrently, with multiple ones of each type of network element to carry out the techniques described herein.

As shown above, the computation phase 402 of FIGS. 4 and 5 comprises computing a reallocation of data sessions among the two RANs, based on performance information and configuration data for the two RANs, using a meta-heuristic algorithm. In mathematical terms, this computation can be represented according to the following mathematical model.

Minimize:

$$C(s) = \{W_{wcdma}*(w_{rnc} \times \Sigma_i \text{RNC}_{i\text{-}KPI} + w_{nodeB}* \\ \Sigma_j \text{NodeB}_{j\text{-}KPI})*y_s + W_{lte}*(w_{sNodeB}* \\ \Sigma_k \text{eNodeB}_{k\text{-}KPI} + w_{sgw} \times \\ \Sigma_l \text{SGW}_{l\text{-}KPI} + w_{mme}*\Sigma_r \text{MME}_{r\text{-}KPI})*y_s\};$$

where $Y_{lts}*y_s <$ MaxCapacityLTE and
$X_{wcdma}*y_s <$ MaxCapacityWCDMA, and $\Sigma_s y_s = 1$ In this formulation, s represents the state of the system, and more particularly represents the allocation of data sessions among the eNodeBs, NodeBs, RNCs, SGWs, MMEs, etc. $y_s$ is a binary variable that is equal to to 1 if state s is chosen and is 0 otherwise. $X_{wcdma}$ is the number of WCDMA sessions associated with state $y_s$, while $Y_{lte}$ is the number of LTE sessions associated with state $y_s$. MaxCapacityWCDMA is the maximum allowed capacity threshold in WCDMA, based on hardware and configuration constraints, while MaxCapacityLTE is the corresponding maximum allowed capacity threshold in LTE, again based on hardware and configuration constraints.

$W_{rnc}$ and $W_{nodeB}$ are prioritization weights for the WCDMA nodes, while $W_{enodeB}$, $W_{sgw}$, and $W_{mme}$ are prioritization weights for the LTE nodes. These prioritization weights allow a system operator to place higher priority on the performance of certain types of nodes, for example. It will be appreciated that prioritization weights may instead or in addition be applied to individual nodes. $RNC_{i\text{-}KPI}$ is a selected performance metric for $RNC_i$—in the formulation given, this is a metric that is minimized $NodeB_{j\text{-}KPI}$, $eNodeB_{k\text{-}KPI}$, $SGW_{l\text{-}KPI}$, and $MME_{r\text{-}KPI}$ are corresponding performance metrics for the NodeBs, eNodeBs, SGWs, and MMEs, respectively. It will be appreciated that appropriate performance metrics for other nodes may be included in a formulation similar to that given above. Likewise, performance metrics for one or more nodes may be omitted in some embodiments.

Performance metrics for the various nodes are key-performance-indicators (KPIs) or other performance-related metrics for the given nodes. These performance metrics may be related to, for example, data throughputs, in the downlink direction, uplink direction, or both. The performance metrics may also or alternatively be related to delays, processor loads, and the like. It will be appreciated that in the formulation shown above, where the objective function C(s) is minimized, that the performance metrics should be formulated so that smaller values represent better performance An alternative approach is to construct an objective function that is to be maximized, in which case the performance metrics should be formulated so that larger values represent better performance Existing metrics (e.g., throughputs) that operate in the opposite manner can be inverted, for example, so that they operate in an appropriate manner. Multiple performance measures relative to a given node can be combined to form a composite performance metric for that node, in some embodiments.

Figure 6:
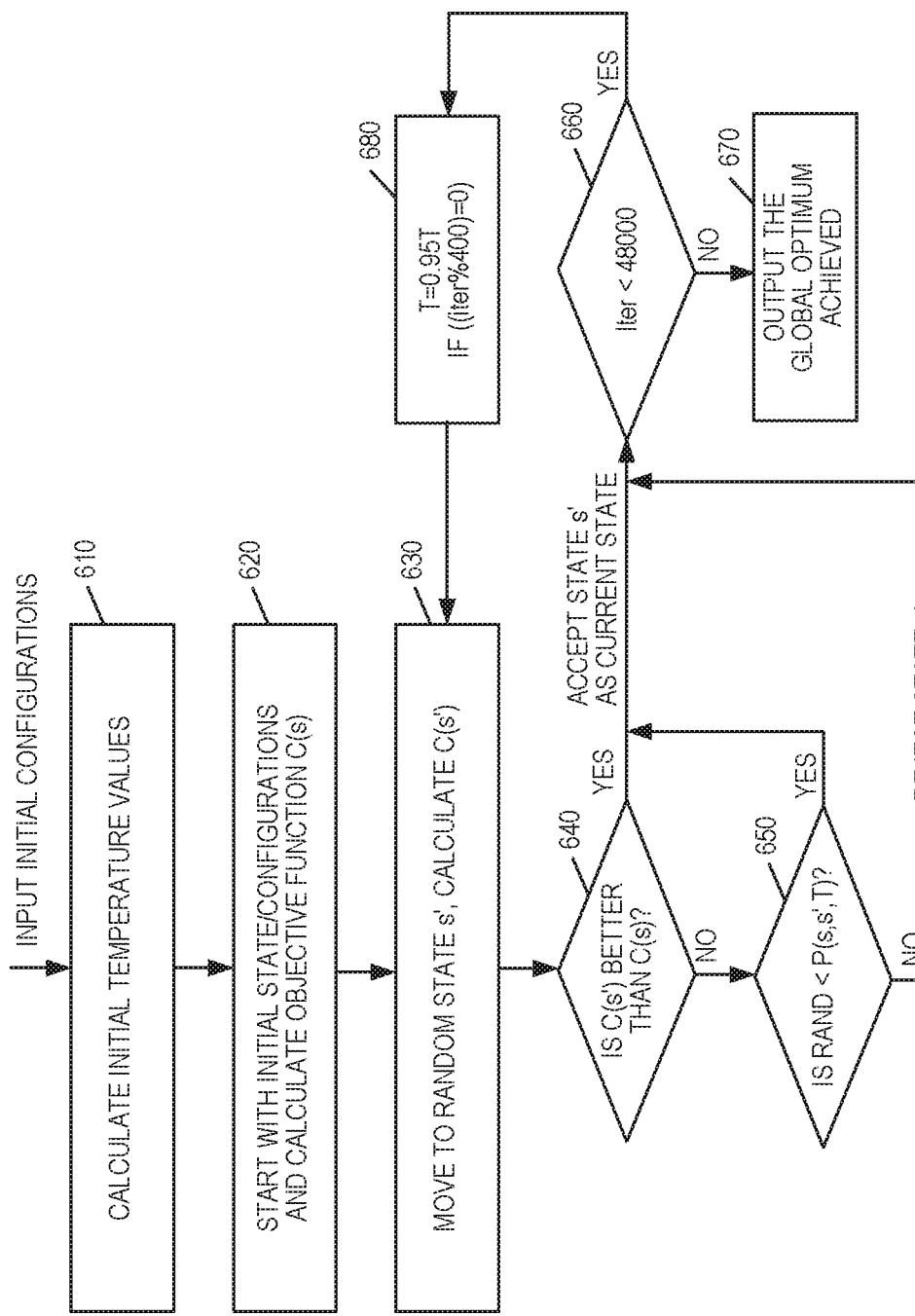
FIG. 6 is a process flow diagram illustrating details of an example metaheuristic algorithm.

FIG. 6 is a process flow diagram illustrating operations, according to an example metaheuristic algorithm, for computing an improved allocation of data sessions between two (or more RANs). In this case, the metaheuristic algorithm is a simulated annealing algorithm—it will be appreciated that other metaheuristic algorithms may be employed in other embodiments of the presently disclosed techniques.

As seen in the figure, the process begins with an initial configuration s. This configuration s represents a current allocation of data sessions among the various nodes of two or more RANs having overlapping coverage areas, e.g., a WCDMA RAN and an LTE RAN. As shown at block 610, the simulated annealing algorithm is initiated with the calculating of an initial temperature value. This initial temperature value may be arbitrarily set, in some embodiments, but is advantageously based on the initial value of the objective function C(s) and/or a number of iterations for the algorithm, in some embodiments. As seen at block 620, a value C(s) for the objective function is calculated, based on the initial system configuration s.

As shown at blocks 630-680, an iterative process is then followed, in this case for a fixed number (48,000) of iterations, as indicated at block 660. Each iteration begins at block 630, which indicates that a neighbor state s' to the current state s is randomly selected and that an objective function value C(s') is calculated for the randomly selected state. The state s' is a neighbor to the current state s in the sense that a single data session or a predetermined number of data sessions are reallocated from one network to another and/or vice-versa, relative to the current state s, while respecting the maximum allowed capacity constraints in each RAN. Which session or sessions are reallocated is randomly selected, in some embodiments. In other embodiments, or in other phases of some embodiments, the selection of which state or states is to be reallocated for a given iteration may be based on one or more of: one or more sessions of a network node that is underperforming, in which case the one or more sessions may be reallocated to a randomly selected node or one that is known to be performing well; or one or more predetermined sessions that are randomly selected for reallocation to a network node that is known to be performing well.

As shown at block 640, the objective function value C(s') is compared to the objective function value C(s) for the current state (the initial state, in the first iteration). If the value C(s') is better (e.g., lower) than the value C(s), then state s' is "accepted" as a new current state, and the current value C(s) is replaced with the new objective function value C(s'). In this case, assuming that the maximum number of iterations has not yet been reached, the algorithm "temperature" T is adjusted, as shown at block 680, and the process is repeated. Note that block 680 indicates that T is reduced by 5% every 400th iteration; the specific approach to reducing the simulated annealing temperature may vary, of course.

If the computed value C(s') is not better than C(s), on the other hand, the randomly selected state s' might still be "accepted" as the new current state. This is shown at block 650, which indicates that a random value is compared to a probability value P(s,s',T), which indicates a probability that the randomly selected state is accepted as the new current state despite having a worse (e.g., higher) computed objective function value than that for the current state. Generally speaking, the function P(s,s',T) produces lower probabilities as the temperature T of the simulated annealing algorithm decreases, i.e., as the process "cools." In some embodiments, the function P(s, s', T) is computed as follows:

If $C\_wcdma(s') > C\_wcdma(s)$ and $C\_lte(s') < C\_lte(s)$, then:

$$P(s,s',T) = e^{-W\_wcdma*(C\_wcdma(s')-C\_wcdma(s))/T\_wcdma}$$

If $C\_wcdma(s') < C\_wcdma(s)$ and $C\_lte(s') > C\_lte(s)$, then:

$$P(s,s',T) = e^{-W\_lte*(C\_lte(s')-C\_lte(s))/T\_lte}$$

If $C\_wcdma(s') > C\_wcdma(s)$ and $C\_lte(s') > C\_lte(s)$, then:

$$P(s,s',T) = (e^{-W\_wcdma*(C\_wcdma(s')-C\_wcdma(s))/T\_wcdma}) \\ *(e^{-W\_lte*(C\_lte(s')-C\_lte(s))/T\_lte})$$

If $C\_wcdma(s') < C\_wcdma(s)$ and $C\_lte(s') < C\_lte(s)$, then:

$$P(s,s',T) = 1$$

Note that in this example, the objective function has been decomposed into two parts, C_wdma(s) and C_lte(s)—this allows the system designer to prioritize the optimization on LTE first and then WCDMA, or vice-versa, through the use of the weights W_lte and W_cdma. Similarly, the temperature T has been decomposed into separate temperatures T_lte and T_wcdma; these can be initially set based on the decomposed objective function values C_wcdma(s) and C_lte(s). With this approach, both temperatures are reduced at each iteration of the algorithm.

Now that detailed examples of the presently disclosed techniques have been provided, it should be appreciated that FIG. 5 illustrates, in process flow form, the several phases described above. It should further be appreciated that the illustrated process, in more general terms, shows an example of a method for allocating data sessions as implemented in a network management node operatively connected to one or more network nodes in each of a first RAN and a second RAN, where the first and second RANs have overlapping coverage areas. As shown at block 401, the method includes receiving current data session information and network performance information for each of the first and second RANs, from the one or more network nodes in the first and second RANs. As shown at block 402, the method further includes computing a reallocation of data sessions among the first and second RANs, based on the performance information and configuration data for the first and second RANs, using a metaheuristic algorithm. Details of an example metaheuristic algorithm will be provided below—a simulated annealing metaheuristic algorithm may be used in some embodiments. Finally, as shown at blocks 403 and 404, the illustrated method includes the triggering of a transfer of one or more current data sessions between the first and second RANs. More specifically, as shown at block 403, one or more network nodes in the first RAN are informed of the computed reallocations to and/or from the first RAN. Likewise, as shown at block 404, one or more network nodes in the second RAN are informed of the computed reallocations to and/or from the second RAN.

In some embodiments, as will be explained in more detail below, the metaheuristic algorithm is based on an objective function that comprises a summation of performance metrics for each of a plurality of network nodes in each of the first and second RANs. These performance metrics are based on allocations of data sessions to each of the plurality of network nodes for a given state. The objective function is further subject to one or more data session capacity constraints for the first and second RANs. In some embodiments, the network nodes for which performance metrics are obtain include base stations and/or radio network node controllers and/or mobility management entities and/or serving gateways. The performance metrics for each network node in a given allocation of data sessions, in various embodiments, are based on one or more of: an estimated uplink or downlink throughput, or both, for the network node; an estimated delay for data traffic through the network node; and a processor load for the network node. The performance metrics for the network nodes are weighted according to pre-determined prioritization weights, in some embodiments.

In some embodiments, as in the detailed examples described herein, the first RAN is a Long Term Evolution (LTE) wireless network and the second RAN is a Wideband Code-Division Multiple Access (W-CDMA) wireless network. However, the disclosed techniques are more generally applicable.

The process flow diagram of FIG. 5 indicates that the process can be repeated. In some embodiments, the receiving, computing, and triggering operations are repeated upon each completion of the triggering operation. In others, the receiving, computing, and triggering operations are repeated at pre-determined intervals. In still others, the receiving, computing, and triggering operations are initiated in response to a problem detection in one or both of the RANs. Two or more of these approaches may be combined, in some embodiments.

Figure 7:
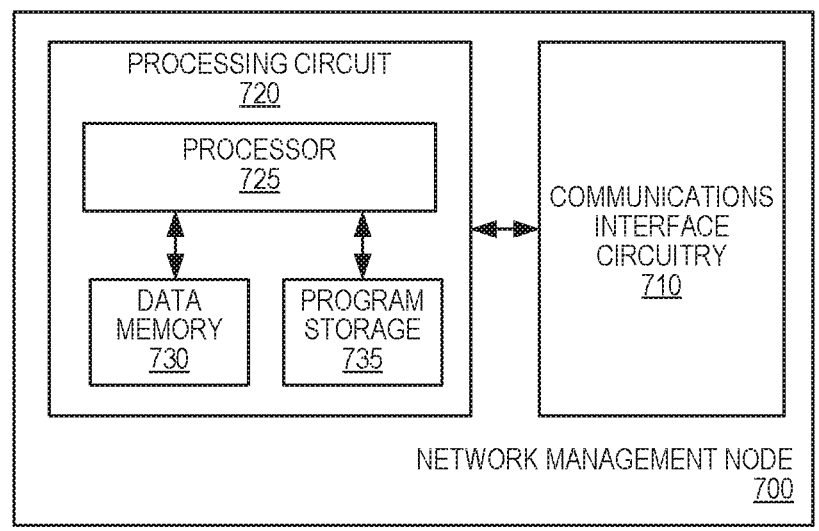
FIG. 7 is a block diagram illustrating features of an example network management node according to some embodiments of the presently disclosed techniques and apparatus.

Embodiments of the presently disclosed techniques include the methods/processes discussed above, as well as corresponding apparatus configured to carry out one or more of these techniques. FIG. 7 thus provides details of an example network management node configured to carry out one or more of the techniques described above, e.g., to carry out a method according to the process flow shown in FIG. 5.

Network management node 700 includes communications interface circuitry 710, which is configured to communicate with one or more network nodes in each of two (or more) RANs having overlapping area. Typically, but not necessarily, this communication is based on Internet Protocol (IP) communications, over any of one or more wired or wireless connections. Thus, communications interface circuitry 710, in addition to hardware configured according to an appropriate physical layer definition, includes processing hardware for implementing appropriate protocol stacks (including, for example, the TCP/IP protocol layers). These protocol stacks may include interface definitions (messages, message parameters, etc.) specific to the one or more network node types that the network management node 700 communicates with; these interface definitions may be based, at least in part, on one or more existing interfaces specified by 3GPP, for example.

Network management node 700 further includes a processing circuit 720, which in turn comprises a processor element 725, which may comprise one more microprocessors, DSPs, or other digital processing circuitry. Processing circuit further includes one or more memory circuits, including data memory 730 and program memory 735. In some embodiments, program memory 735 comprises program code that, when executed by processor 725, causes the processing circuit 720 to control the communications interface circuitry 710 and to carry out one or more of the techniques described herein. Data memory 730 is used to store the various data collected, created, and or modified during the carrying out of these techniques; this data may include, for example, the configuration, data sessions, and performance information collected from the RANs, the current states, selected states, and temperatures used in carrying out the metaheuristic algorithm, and other program and configuration data needed to carry out the presently disclosed techniques.

In particular, the processing circuit 720, in several embodiments, is configured to receive, via the communications interface circuitry, current data session information and network performance information for each of the first and second RANs, from the one or more network nodes, to compute a reallocation of data sessions among the first and second RANs, based on the performance information and configuration data for the first and second RANs, using a metaheuristic algorithm, and, to trigger, based on the computed reallocation and via the communications interface circuitry 710, a transfer of one or more current data sessions between the first and second RANs. The several variations of this technique described above in connection with FIGS. 4-6 are equally applicable to the technique carried out by processing circuit 720, in this and in other embodiments.

Figure 8:
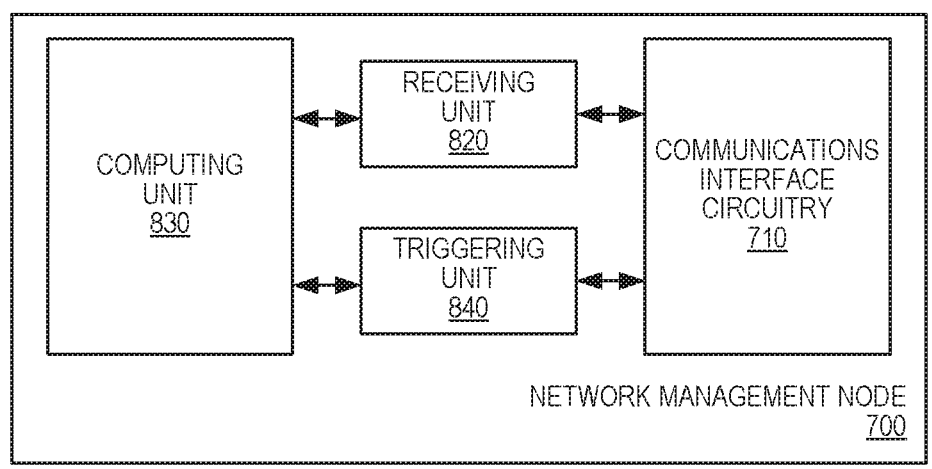
FIG. 8 is a block diagram illustrating another representation of a network management node according to some embodiments.

It will be appreciated that the network management 700 illustrated in FIG. 7, and in particular the processing circuit 720 therein, may be conceived as comprising several functional units, any or each of which may be implemented using one or more processing elements configured with appropriate software, firmware, and/or supporting digital hardware. Thus, FIG. 8 illustrates another representation of network management node 700, in this case comprising communications interface circuitry 710 and several functional units. These functional units include, in addition to the communications interface circuitry 710, which is configured to communicate with one or more network nodes in each of a first RAN and a second RAN, a receiving unit 820 for receiving, via the communications interface circuitry 710, current data session information and network performance information for each of the first and second RANs, from the one or more network nodes. Also included is a computation unit 830 for computing a reallocation of data sessions among the first and second RANs, based on the performance information and configuration data for the first and second RANs, using a metaheuristic algorithm, and a triggering unit 840 for triggering, based on the computed reallocation and via the communications interface circuitry 710, a transfer of one or more current data sessions between the first and second RANs.

It will be appreciated by the person of skill in the art that various modifications may be made to the above described embodiments without departing from the scope of the present invention. For example, it will be readily appreciated that although the above embodiments are described with reference to parts of one or more 3GPP-based networks, an embodiment of the present invention will also be applicable to like networks, such as a successor of the 3GPP network, having like functional components. Therefore, in particular, the terms 3GPP and associated or related terms used in the above description and in the enclosed drawings and any appended claims now or in the future are to be interpreted accordingly.

Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

What is claimed is:

1. A method, in a network management node operatively connected to a plurality of network nodes comprising each of a first radio access network (RAN) and a second RAN, the first and second RANs having overlapping coverage areas, the method comprising:
    receiving, from the plurality of network nodes, current data session information and network performance information for each of the first and second RANs;
    computing a reallocation of data sessions among the first and second RANs, based on the performance information and configuration data for the first and second RANs, using a metaheuristic algorithm, wherein:
        the metaheuristic algorithm is based on an objective function that comprises a summation of performance metrics for each of the plurality of network nodes comprising each of the first and second RANs;
        the performance metrics are based on allocations of data sessions to each of the plurality of network nodes; and
        the objective function is subject to one or more data session capacity constraints for the first and second RANs; and
    based on the computed reallocation, triggering a transfer of one or more current data sessions between the first and second RANs.

2. The method of claim 1, wherein the plurality of network nodes comprises a plurality of base stations.

3. The method of claim 2, wherein the plurality of network nodes further comprises one or more radio network controllers.

4. The method of claim 1, wherein the performance metrics for one or more of the plurality of network nodes, for each given allocation of data sessions, are based on one or more of:
    an estimated uplink or downlink throughput, or both, for the network node;
    an estimated delay for data traffic through the network node; and
    a processor load for the network node.

5. The method of claim 1 wherein one or more of the performance metrics for the network nodes are weighted according to pre-determined prioritization weights.

6. The method of claim 1, wherein the metaheuristic algorithm employs a simulated annealing metaheuristic.

7. The method of claim 1, wherein the first RAN is a Long Term Evolution (LTE) wireless network and the second RAN is a Wideband Code-Division Multiple Access (W-CDMA) wireless network.

8. The method of claim 1, wherein the receiving, computing, and triggering operations are repeated upon each completion of the triggering operation.

9. The method of claim 1, wherein the receiving, computing, and triggering operations are repeated at pre-determined intervals.

10. The method of claim 1, wherein the receiving, computing, and triggering operations are initiated in response to a problem detection in one or both of the RANs.

11. A network management node, comprising:
    communications interface circuitry configured to communicate with a plurality of network nodes comprising each of a first radio access network (RAN) and a second RAN, and
    a processing circuit configured to:
        receive, from the plurality of network nodes via the communications interface circuitry, current data session information and network performance information for each of the first and second RANs
        compute a reallocation of data sessions among the first and second RANs, based on the performance information and configuration data for the first and second RANs, using a metaheuristic algorithm, wherein:
            the metaheuristic algorithm is based on an objective function that comprises a summation of performance metrics for each of the plurality of network nodes comprising each of the first and second RANs;
            the performance metrics are based on allocations of data sessions to each of the plurality of network nodes; and
            the objective function is subject to one or more data session capacity constraints for the first and second RANs; and
        based on the computed reallocation, trigger, via the communications interface circuitry, a transfer of one or more current data sessions between the first and second RANs.

12. The network management node of claim 11, wherein the plurality of network nodes comprises a plurality of base stations.

13. The network management node of claim 12, wherein the plurality of network nodes further comprises one or more radio network controllers.

14. The network management node of claim 11, wherein the processing circuit is configured to calculate performance metrics for one or more of the plurality of network nodes, for each given allocation of data sessions, based on one or more of:
    an estimated uplink or downlink throughput, or both, for the network node;
    an estimated delay for data traffic through the network node; and
    a processor load for the network node.

15. The network management node of claim 11, wherein the processing circuit is configured to weight one or more of the performance metrics for the network nodes according to pre-determined prioritization weights.

16. The network management node of claim 11, wherein the metaheuristic algorithm employs a simulated annealing metaheuristic.

17. The network management node of claim 11, wherein the first RAN is a Long Term Evolution (LTE) wireless network and the second RAN is a Wideband Code-Division Multiple Access (W-CDMA) wireless network.

18. The network management node of claim 11, wherein the processing circuit is configured to repeat the receiving, computing, and triggering operations upon each completion of the triggering operation.

19. The network management node of claim 11, wherein the processing circuit is configured to repeat the receiving, computing, and triggering operations at pre-determined intervals.

20. The network management node of claim 11, wherein the processing circuit is configured to initiate the receiving, computing, and triggering operations in response to a problem detection in one or both of the RANs.

* * * * *